(12) United States Patent
Lankreijer et al.

(10) Patent No.: US 8,284,426 B2
(45) Date of Patent: Oct. 9, 2012

(54) METHOD FOR GENERATING PRINT JOBS IN A PRINTING SYSTEM, COMPUTER PROGRAM PRODUCT AND PRINTING SYSTEM FOR CARRYING OUT SAID METHODS

(75) Inventors: Herman Lankreijer, Hofsingelding (DE); Viktor Benz, Poing (DE)

(73) Assignee: Océ Printing Systems GmbH, Poing (DE)

( * ) Notice: Subject to any disclaimer, the term of this patent is extended or adjusted under 35 U.S.C. 154(b) by 1418 days.

(21) Appl. No.: 11/816,846

(22) PCT Filed: Feb. 23, 2006

(86) PCT No.: PCT/EP2006/001645
§ 371 (c)(1), (2), (4) Date: Aug. 22, 2007

(87) PCT Pub. No.: WO2006/089743
PCT Pub. Date: Aug. 31, 2006

(65) Prior Publication Data
US 2008/0266594 A1  Oct. 30, 2008

(30) Foreign Application Priority Data
Feb. 24, 2005  (DE) .......................... 10 2005 008 520

(51) Int. Cl.
*H04N 1/40* (2006.01)
(52) U.S. Cl. ........................ 358/1.15; 358/1.16; 358/468
(58) Field of Classification Search .................... 358/1.9, 358/2.1, 468, 1.13, 1.15–1.16, 400, 402–403, 358/504
See application file for complete search history.

(56) References Cited

U.S. PATENT DOCUMENTS

| | | | |
|---|---|---|---|
| 5,113,355 A | 5/1992 | Nomura | |
| 6,282,709 B1 | 8/2001 | Reha et al. | |
| 6,466,935 B1 | 10/2002 | Stuart | |
| 6,587,861 B2 | 7/2003 | Wakai et al. | |
| 6,654,135 B2 * | 11/2003 | Mitani | 358/1.15 |
| 7,535,591 B2 | 5/2009 | Kujirai | |
| 2002/0114004 A1 | 8/2002 | Ferlitsch | |
| 2004/0111418 A1 | 6/2004 | Nguyen et al. | |
| 2004/0111430 A1 | 6/2004 | Hertling et al. | |
| 2004/0131377 A1 | 7/2004 | Bardolatzy et al. | |
| 2004/0218201 A1 | 11/2004 | Lermant et al. | |
| 2004/0239974 A1 | 12/2004 | Uchida et al. | |
| 2005/0119901 A1 | 6/2005 | Ulrich | |

FOREIGN PATENT DOCUMENTS
DE  698 13 504  12/2003
(Continued)

OTHER PUBLICATIONS
Advanced Function Presentation—Programming Guide and Line Data Reference, 2000.
(Continued)

*Primary Examiner* — Thomas D Lee
*Assistant Examiner* — Stephen M Brinich
(74) *Attorney, Agent, or Firm* — Schiff Hardin LLP

(57) ABSTRACT

In a method or printing system for generation of document processing jobs, control parameters for the document processing jobs are read from different sources and stored in a control file. Priorities are associated with the sources. In the event specific control parameters are present in a plurality of the sources, control parameters from the sources that have a highest priority are stored in the control file.

19 Claims, 5 Drawing Sheets

FOREIGN PATENT DOCUMENTS

| | | |
|---|---|---|
| DE | 102 50 187 | 5/2004 |
| DE | 103 39 511 | 7/2004 |
| EP | 0 720 086 | 7/1996 |
| EP | 1 098 242 | 5/2001 |
| JP | 2004-164105 | 6/2004 |
| WO | WO 03/065197 | 8/2003 |
| WO | WO 2004/104739 | 12/2004 |

OTHER PUBLICATIONS

Das Druckerbuch Technik and Technologien der Océ-Drucksysteme Drucktechnologen, 2001.

The World of Printers Technologies of Océ Printing Systems Printing Technologies Edition May 6, 2001.

* cited by examiner

METHOD FOR GENERATING PRINT JOBS IN A PRINTING SYSTEM, COMPUTER PROGRAM PRODUCT AND PRINTING SYSTEM FOR CARRYING OUT SAID METHODS

BACKGROUND

The preferred embodiment concerns a method for generation of document processing jobs in a printing system, a method for sorting of print jobs in a printing system and a method for transmission of print jobs from a client to a printing system with a print server. The preferred embodiment furthermore concerns a computer program product and a printing system for execution of the method of the preferred embodiment. It in particular concerns the handling of print jobs that are sent to high-capacity printing systems whose print speed is approximately 40 pages up to over 1000 DIN A-4 pages per minute.

For processing of such print jobs, printing systems are frequently used that receive print data from a data source; prepare these print data for the printing, whereby under the circumstances they are converted from a first data format into a second data format suitable for a specific printer; and finally directly transfer the data stream so converted to a connected printer.

In the publication "Das Druckerbuch", Dr. Gerd Goldmann (HSG), 6th edition (May 2001), Océ Printing Systems GmbH, Poing", what are known as Océ PrismaPro server systems are described in chapter 14 that are in the position to process aforementioned print jobs. For this various system components are provided that provide for an extensive automation in the generation of a print job. Print jobs can be generated at an arbitrary client console in a client network and these can be transferred to an order distribution system by means of a print job manager.

The processing of print jobs in a print production environment definitely depends on enabling an optimally performing, flexible processing of the print jobs in order to achieve a high utilization of the connected production printers and therewith a high productivity.

A typical print data format in an electronic print production environment is the format AFP (Advanced Function Presentation) which is described, for example, in the publication Nr. S-544-3884-02 from the company International Business Machines Corporation (IBM) with the title "AFP Programming Guide and Line Data Reference".

DE 698 13 504 T2 or the corresponding EP 0 951 679 B1 describes a method for updating of software, whereby software stored on remote servers should be downloaded automatically. Among other things, the version of the corresponding data can occur via checking of a time and date stamp associated with the respective file. If a new version is hereby determined, this is automatically downloaded from the remote server.

The printing process becomes increasingly more comprehensive since ever more apparatuses are integrated into a printing process, whereby the function diversity increases. Additionally, due to the internet and intranet, printing processes are increasingly executed distributed regionally or are associated with a pool of printers that can be regionally distributed. Moreover, apparatuses of different manufacturers must increasingly operate together in a process. In order to be a match for these increased requirements, a uniform specification for exchange of data formats in a printing process was agreed upon that is designated as a job definition format (JDF). For this there is a corresponding job messaging format (JMF) that is correspondingly specified. The specification of JDF can be downloaded from the Internet site www.cip4.org; at the point in time of the present patent application the current specification is JDF Specification Release 1.3.

A workflow based on JDF is known from DE 103 39 511 A1.

An output management system for print jobs with the trade name Océ Print Exec Pro® is known from Océ Technologie B.V, Netherlands, in which it is provided that production dates or times are specified with the dispatch of the job with regard to print jobs.

Systems for processing of print jobs are known from EP 0 720 086 B1 and from US 2004/0218201 A1.

A method and a system for processing of jobs are known from U.S. Pat. No. 6,587,861 B2, in which a selection from a plurality of processing apparatuses can be made for execution of the jobs.

The aforementioned publications and documents are herewith incorporated by reference into the present specification.

JDF is an XML-based format in which the instructions for the printing process are arranged in a tree structure. Every node of the tree structure comprises an instruction or a set of instructions. The uppermost node is designated as a root. The end nodes at branches are designated as leaf nodes. Furthermore, the nodes are hierarchically structured, whereby in the tree structure product nodes lie at the tip or in the upper region, process group nodes lie in a middle region, and process nodes lie in the lower region.

The distinctiveness of JDF lies in that there can be what are known as intent nodes that contain a very general instruction for the printing process that must be rendered more precisely in order to be able to be executed at an apparatus. The product nodes are in particular also designated as product intent nodes. This more precise rendering, which is also designated as a resolution, is executed by a corresponding controller in the course of the printing process in that one or more further nodes that enter the instruction of the intent node more precisely are subordinated to the intent node. This resolution can occur in steps, meaning that a cascade of further nodes are subordinated to the intent node, whereby the exact instructions for the apparatus (in particular the printer) are contained in the last node (the leaf node).

The resolution of the intent instructions into more precise instructions up to the commands contained in the leaf nodes occurs by means of programs that are designed similar to device drivers and that convert general intent instructions into more concrete intent instructions or into concrete commands for a printer or an apparatus. Specifications about resources that are contained in the respective nodes are also taken into account in this conversion. According to the JDF specification, resources are all things that are consumed or produced. They comprise physical objects (such as, for example, paper, ink) or data in the form of files or parameters. A resource has an XML ID with which it is identified in the overall job ticket.

A method for automated acceptance and forwarding of document processing jobs is known from WO-A-03/065197 in which, to create a print job from at least one file, the file is transferred into a specific folder of a receiving server; the folder is automatically checked with regard to newly arrived print jobs in regular, in particular configurable intervals; and a new print job is generated, added from the newly arrived print job. Three possibilities of how the control of the acceptance and forwarding of the print jobs occurs are hereby provided. According to the first possibility, print jobs comprise only print data, whereby a predetermined control file of the printing system (default job ticket) is used for printing of these print data. Given a second possibility, a job-individual control file (ob ticket) is used. Given the third possibility, the print jobs contain print data and comprise respectively parameterized file names for further processing. The further printing process is controlled using the parameters specified in the file name. These three possibilities for controlling the print job can also be applied in combination. In particular the predetermined control file is often used in connection with further control information.

In contrast to this, in the present document the term "print job" or "document processing job" is used as a designation for the files that are generated via such a method for automatic acceptance and forwarding of document processing jobs. As a rule it is no longer possible to add further files in such a document processing job.

In the present document the individual files that contain the data to be printed are designated as print files.

Print files that are sent from a client to a print server and there are converted into the document processing jobs via such a method for automatic acceptance and forwarding of document processing jobs are designated as print jobs. These print jobs are also normally provided with control information.

The print jobs are thus a type of "document processing job" that contains only job-specific control information that is generated at a client and not in a printing system. The document processing jobs are "document processing jobs" with job-specific and printing system-specific control information. The printing system-specific control information are added to the document processing jobs at the printing system, in particular at the print server.

This known method has proven its worth very well. However, due to the development that has occurred in recent years to distribute print jobs and print tasks to different print servers and printers via data networks, the data volume that is to be processed by a server steadily increased. A significant need has hereby arisen for a method for automatic acceptance and forwarding of document processing jobs that can quickly and flexibly handle such large data volumes.

Methods for sorting of print jobs that are stored in an individual file folder are known. Given these conventional methods for sorting of print jobs the print jobs are sorted using the file access time that is stored upon generation of the respective file. However, it is hereby disadvantageous that the smallest time unit that is recorded in the file access time is typically one second. A plurality of files in a folder can be generated within one second, in particular given multitasking systems.

However, in particular in high-capacity printing a significant need exists for sorting of print jobs since substantial print exemplars (such as, for example, books) are distributed to a plurality of print jobs. If the individual print jobs were to be transposed in order, the entire print exemplar (which is normally automatically bound) would be good for nothing.

In high-capacity printing systems a plurality of print files are often combined into one document processing job. A control file is hereby normally generated that is also designated as a job ticket and that automatically controls the further processing, in particular the printing, cutting, punching and binding. A need exists to feed print jobs to the printing system via different interfaces (inputs). Furthermore, it is desired to merge a plurality of print files into a single document processing job. This is presently not practically possible since the individual print jobs contain different sources for control parameters that can result in an uncontrolled workflow given a combination.

SUMMARY

It is an object to achieve a method for generation of document processing jobs in a printing system with which control parameters from different sources can be used and a controlled workflow of the execution is ensured.

A further object is to achieve a computer program product for execution of the inventive methods as well as a corresponding printing system.

In a method or printing system for generation of document processing jobs, control parameters for the document processing jobs are read from different sources and stored in a control file. Priorities are associated with the sources. In the event specific control parameters are present in a plurality of the sources, control parameters from the sources that have a highest priority are stored in the control file.

BRIEF DESCRIPTION OF THE DRAWINGS

FIG. 7 is a window for display of a list of print jobs to be transferred (File 1, File 2, File 3); and FIG. 8 is a control window for display of a plurality of print channels.

DESCRIPTION OF THE PREFERRED EMBODIMENT

Figure 1:
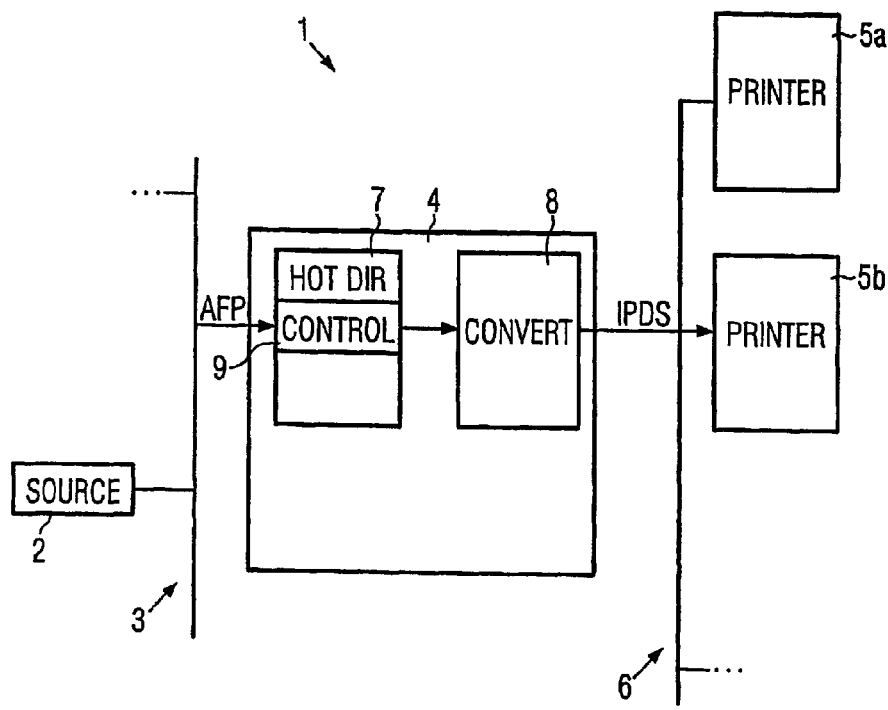
FIG. 1 illustrates a high-capacity printing system.

For the purposes of promoting an understanding of the principles of the invention, reference will now be made to the preferred embodiment and best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

According to a first aspect of the preferred embodiment, control parameters for the document processing job are read from different sources and stored in a control file to generate document processing jobs in a printing system. Priorities are associated with the sources and, in the event that specific control parameters are present in a plurality of sources, the control parameters from those sources that possess the highest priority are stored in the control file.

It is hereby determined which control parameters are written in the control file, whereby the automatic execution of the document processing job is exactly predetermined and no unwanted surprises can occur that are caused in that different parameter values regarding the same parameter type are contained in specific sources (job ticket, parameterized file name, control information in print file etc.), whereby a parameter value is read and adopted that is less suitable than a parameter value of another source. Previously neither the user nor the administrator of a printing system could influence from which sources the parameters should be read and adopted.

In contrast to this, with this aspect of the preferred embodiment the control parameters that originate from different sources are controlled according to priorities and entered into the control file.

According to a second aspect of the preferred embodiment that can be executed independently or in combination with the first aspect, a check of specific directories as to whether a new file belonging to a print job has been generated is repeatedly implemented for sorting of print jobs in a printing system, and a job identification number is associated with each new print job, whereby the job identification number for print jobs that are generated in a specific group of directories are respectively generated chronologically and a plurality of print jobs are sorted corresponding to their job identification numbers. The job identification numbers are generated for a print job as soon as a file of the print job is stored in a directory to be monitored.

Print jobs can be stored distributed over a plurality of directories with the last cited method of the preferred embodiment, whereby the incoming print jobs are sorted in a common chronological order. The directories in which files of print jobs that are sorted together can be stored respectively form a group of directories. There can be a plurality of such groups of directories across which the print jobs are chronologically sorted. The individual groups of directories can comprise a single directory or a plurality of directories.

The method of the preferred embodiment can therefore be used very flexibly since the print jobs can be stored distributed over a plurality of directories.

Since a job identification number is associated with the corresponding print job upon discovery of a new file in one of the directories to be monitored, and the job identification number is assigned to a group of directories by a common instance, the chronological order of the individual print jobs is ensured.

According to a third aspect of the preferred embodiment that can be executed independently or also in combination with the aforementioned aspects, a personal computer client is used for transmission of print jobs to a printing system with a print server. On the personal computer client is installed an operating system that comprises a program for presentation of files (such as, for example, Microsoft Explorer®), and exhibits a function for direct transmission to predetermined receivers such as, for example, storage media, network connections etc. This direct transmission function is used for direct transfer of files for transmission of print jobs to a printer or a print server of the printing system.

In particular more complex print jobs that comprise a plurality of print files can be transmitted very simply and quickly to a further-processing apparatus (such as, for example, a print server or a print apparatus) with this aspect of the preferred embodiment in that all relevant files are marked and are sent directly to the desired output apparatus via the direct transmission function.

Shown in FIG. 1 is a printing system 1 in which print data are transmitted from a data source 2 (such as a host computer, a tape drive, an application computer or the like) to a print server 4 via a first network 3. The data transfer thereby occurs per file, whereby a plurality of files can belong to a specific print job. Given conventional methods, a plurality of files can be merged into one print job only when a special control file is used that is designated as a "job ticket". A specific memory region (i.e. a main directory with possibly one or more subdirectories) can be respectively provided in the print server 4 for each print job, in which memory region all files belonging to the print job are stored as soon as they arrive at the print server 4. Alternatively, it is also possible that a single directory 7 is provided for a plurality of incoming print jobs.

In principle the incoming print jobs are converted in a conversion module 8 into a data stream adapted to the respective printer. In the present example, a plurality of print apparatuses 5a, 5b are connected to the print server 4 via a second network 6, whereby the print data are transferred between the print server 4 and the print apparatuses 5a, 5b in the language "IPDS" (Intelligent Printer Data Stream) adapted to the printer.

The automated acceptance and forwarding of document processing jobs (in particular of print jobs) is controlled by means of a control program 9. The control program is advantageously a program that runs in the background, whereby typically no direct user indications occur. Under Unix and its derivatives such programs are designated as daemons (Disc and Execution Monitor). In Microsoft Windows® the corresponding programs are called services. A daemon can also run when no user is logged onto the computer. A frictionless workflow is hereby ensured, even when no user is presently active at the computer.

Figure 2:
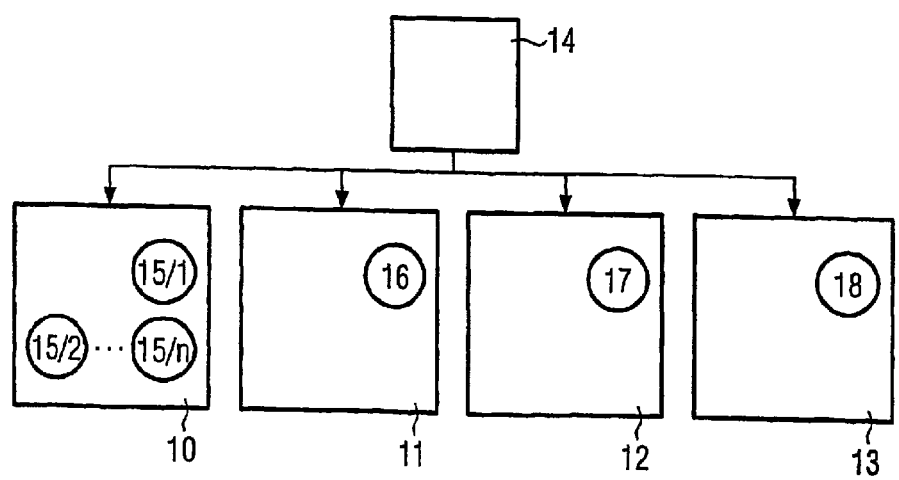
FIG. 2 shows schematically the design of a control program.

The control program 9 is designed modularly, whereby its rough structure is schematically represented in FIG. 2 as a block diagram. The control program comprises four modules 10, 11, 12, 13.

The first module 10 checks a directory to be monitored for the arrival of new files. Newly arrived files are recorded or registered by the control program 9 and marked for further processing.

The second module 11 checks whether arrived files or print jobs are finished. This module operates according to a known method principle. This known method principle is based on the polling of all processes, whereby it is determined whether the processes have opened a specific file in the directory to be examined. The third module 12 organizes multiple print jobs in the correct order to be printed. This module is designated as a "job sequencing".

With the fourth module 13 the print jobs are forwarded to the conversion module 8 for printout at a printer 5a, 5b.

Upon starting the control program 9, empty job templates that are still without relation to a concrete job are placed in job lists 15/1 through 15/n of the module 10 for directories entered into a configuration file of the control program 9. These job templates still independent of jobs are designated as sample job templates. Specific parameters for the respective directories are entered into these sample job templates and specific methods that are executed in the processing of the individual job templates in one of the modules 10 through 13 are associated with them.

The processing of the individual print jobs in the modules 10 through 13 is controlled by a method "AddJob" 14.

The module 10 comprises a plurality of job lists 15/1, 15/2 through 15/n that respectively contain temporary print jobs that are designated as jobs.

Given the method of the preferred embodiment three types of print jobs are differentiated. There are print jobs that comprise only a single print data file. There are print jobs that comprise one or more print data files and a job ticket, whereby in which order the print files of the print job are to be printed can be regulated in the job ticket. There are print jobs that comprise one or more print data files and a trigger file (explained below) and optionally a job ticket, whereby the order in which the print files of the print job are to be printed is regulated not in the trigger file but rather only in the job ticket.

The jobs are processed with different scan rates, whereby a list is respectively provided for jobs of a specific scan rate.

When a new print job ND1 is generated in one of the directories to be monitored, the files belonging to this print job are registered by the module 10 according to a method explained below and shown in FIGS. 3a, 3b. The module 10 hereupon copies a sample job template prepared for the directory from one of the corresponding lists 15/1 through 15/n and supplements the copied job template (in which the print job ND1 has been generated) with the parameters (such as, for example, its name, the trigger file name etc.) belonging to the job. This job template thus individualized for a specific job, i.e. a temporary print task or print job, is stored in one of the further modules 11 through 13 for the further processing of the jobs.

By which modules a specific job is to be processed is entered into its job template or into the configuration file of the control program 9. The further modules 11, 12 and 13 in turn comprise job lists 16, 17 and 18 in which the job templates are incorporated. The transfer of the job template from one of the lists of a module to another list of a different module occurs merely via alteration of a corresponding pointer, which is executed by the method "AddJob" 14.

The individual modules are decoupled from one another via the provision of the job lists, whereby it is also possible that all modules are not always executed upon execution of a specific print job; rather, in particular the modules 11 and/or 12 can also be omitted as needed. The individual tasks can be processed independent of one another via the decoupling of the individual modules, which is why it is not necessary that a module for execution of a specific task must wait until another module is finished with the execution of a different task, whereby delays in the execution of the individual tasks are avoided.

The module 10 serves for monitoring of the arrival of new files. It is already known to monitor the arrival of new files in a directory of a print server. In the conventional method a directory is opened, meaning that a corresponding directory configuration file is opened that comprises one entry for each file stored in the respective directory. The content of this file is read and all files that have previously not yet been registered by the control program for the further processing are detected and registered.

After this all further directories are opened in succession until all directories have been checked. The check as to whether new files have arrived in comparison to the preceding query subsequently begins again at the first directory and is repeated for all further directories. This regular opening and checking of files is also generally designated as polling. Polling methods in which a comprehensive processing occurs in each polling step demand considerable computation power and hereby delay the automatic handling of the print jobs on the print server 4.

Figure 3A:
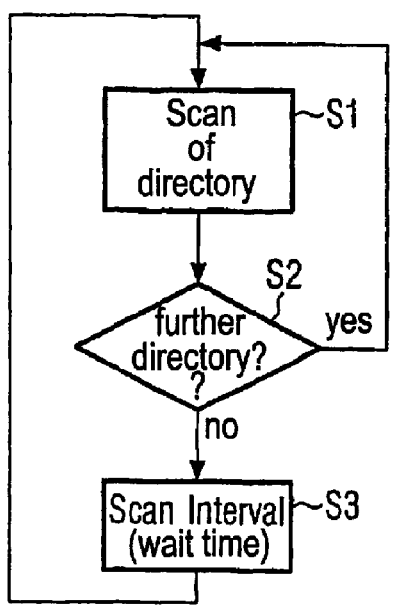
FIGS. 3a, 3b illustrate schematically in a block diagram, a method for checking whether new files have been entered into specific directories.
Figure 3B:
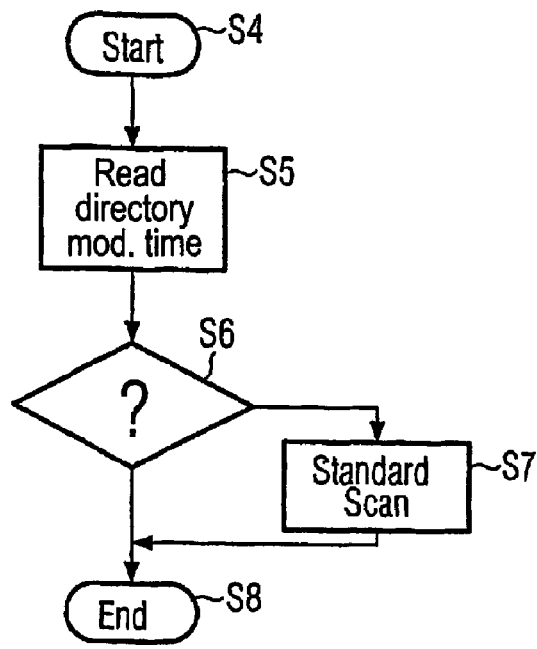

The method shown in FIGS. 3a and 3b for regularly checking a directory is therefore executed with the preferred embodiment.

FIG. 3a shows a method with which a program for scanning of a directory (step S1) is repeatedly called in an endless loop. After the step S1 a query (S2) occurs in which it is checked whether a further directory is to be scanned. The next entry from the corresponding job list 15 is hereby read in module 10. If such an entry is present, the method workflow again passes to the step S1 and the program for scanning of this further directory is called.

In contrast to this, if it is established in step S2 that all directories have been scanned, the method workflow passes to the step S3 with which it waits (corresponding to a predetermined scan interval) until the scanning passes again to the step S1 and the job list 15 begins with the scanning of the first directory. A method according to FIG. 3a is started for each job list, whereby the individual methods are set to different scan rates, i.e. different scan intervals.

FIG. 3b shows a scanning program of the preferred embodiment that is called in step S1. This scan program begins with the step S4.

A directory modification time of the directory is read in the subsequent step S5 and the current time is determined.

In step S6 it is checked whether 1: the read directory modification time is identical to a directory modification time determined for the directory from one of the preceding scan processes, and 2: whether the current time differs from the stored directory modification time or the read directory modification time by a time interval that corresponds to at least the smallest time unit with which the directory modification time is recorded.

If one of the two conditions is not satisfied, the method workflow passes to the step S7 in which a conventional standard scan or an exhaustive check of the directory occurs as it is known from the prior art, in which the directory configuration file is read and it is determined whether files not yet recorded and registered are contained herein. If such a file is determined, it is detected in step S7 and registered via copying and supplementation with the parameters of a corresponding job template, which parameters are specific to the print job. The current directory modification time of the directory is additionally stored in a corresponding job template in step S7.

With the first condition of the query from step S6 it is checked whether the directory has been modified since the preceding scan procedure (S7). When this is not the case, no file can have been generated in the directory. The files thus do not have to be individually checked. With the second condition it is ensured that the scan according to the step S5 was, with regard to the last complete scan (step S7), executed with no such short time interval that is smaller than the smallest time unit that can be determined with the directory modification time. For example, if the directory modification time is measured in units of $1/10$ of a second, the scanning according to step S7 and the scanning according to step S5 can occur within $1/10$ of a second, whereby the same directory modification time would be indicated. Nevertheless it would be possible that the files in the directory had been changed in the meanwhile. These conditions must be satisfied in order to remedy this problem.

In the first pass of the method according to FIG. 3b, no directory modification time has been stored in the corresponding job template. Therefore the read directory modification time always differs from the nonexistent stored modification time in the first pass and the method branches in step S6 to the step S7, in which the directory is initially completely checked and the current directory modification time is stored in the job template.

If the query in step S6 yields that the two conditions for the directory are satisfied, the result of the query is then a "yes" and the method workflow passes to the step S8 with which this program for scanning of a directory is ended. The method workflow then passes to step S2 according to the method from FIG. 3a.

Given the standard scan in step S7, via opening and reading of e directory configuration file it is checked whether the files listed therein have already been recorded by the control program 9 and registered for the further processing. The standard scan is also designated as an exhaustive check since here the directory configuration file is entirely read.

The compliance with the time interval according to the 2nd condition of the query from step S6 is advantageously realized in that the current read time is reduced to the time unit of the directory modification time, in that the corresponding digits in the numerical value of the time are erased. For example, if the directory modification time is measured in units of $1/10$ of a sec, the specification of the current time is reduced to the unit of $1/10$ of a sec, even when the current time should be measured significantly more precisely. All digits are hereby erased that concern ¹/₁₀₀ of a sec or even smaller time units. Due to the reduction of the time units of the current time, the check of the second condition occurs merely via comparison of the current time with the directory modification time, and if these two specifications differ the current time lies outside of the time interval described above.

The readout of only the directory modification time and comparison with the stored directory modification time can be executed significantly quicker than the reading and checking of the entire directory configuration file. The directory modification time is read out from a directory configuration file that is associated with the directory superordinate to the directory to be examined. Corresponding commands are provided for this in the typical operating systems, such as "stat" or "staffs" in Linux, for example.

If this method is executed with the same scan rate as a conventional method, significantly less processor power is required. The scan rate is adjustable. In conventional methods it typically lies in a range from 1 sec to 5 sec. With the method of the preferred embodiment the scan rate can be shortened up to approximately 100 μsec, whereby scan rates in the range from 100 psec to 5 sec are possible. In principle longer scan rates are also possible, whereby longer scan rates than 20 sec are for the most part not appropriate. Scan rates in the range from 10 msec to 5 sec are normally appropriate. The scan rate can advantageously be set in a configuration file for the directory to be scanned as a multiple (for example ×1, ×10, ×50, ×100, ×500) of the set minimal scan rate of 100 psec to 1 sec.

The method explained above according to FIG. 3b is designated as a FastScan or fast check. In the configuration of the directories it can be established whether the respective directory is to monitor new files [sic] with a conventional scanning method or by means of FastScan. Given the entry of the job template into the job list of the module 10, in this regard a pointer that points to the methods of FastScan or to the methods of a conventional standard scan is entered into the respective job template. The conventional standard scan comprises only the step S7, whereby here the storage of the directory modification time can be omitted. A scan exclusively with the conventional standard scan (=exhaustive check) is then appropriate when new files are generated in the directory in very quick temporal sequence (whereby here the temporal sequence must be extremely short) or when a directory modification time is not available. However, this is only rarely the case, which is why FastScan is significantly quicker for most directories than the conventional scanning by means of a standard scan.

The module 11 for checking whether print jobs are finished is subsequently explained in detail.

This check conventionally occurs in that it is determined whether a file is still open. If the file is no longer open, it is assumed that the process that has written the file has concluded the handling of this file. This is also applicable in most cases. However, given a crash of a process or a computer that writes to a file, the not yet completely finished file is also closed. This has the consequence that an incomplete file is supplied to further processing. Misprints and expenses are therewith generated.

Instead of the module 11, the module 10 can be designed in the preferred embodiment such that routines are provided for writing of files of a print job into directories, which routines generate a trigger file after completed generation of the print job in the directory. A complete generation of the print job means that, on the one hand, all files belonging to the print job are completely generated and, on the other hand, that all processes relevant for the writing of the files of the print job have been ended without error. For example, this trigger file comprises the entire name of the print job to be printed, whereby a specific change (such as, for example, ".trig") is appended to the file name, however. The trigger file itself contains no data.

Before the print job is supplied to the further processing, it is checked by the module 10 whether a corresponding trigger file is present. When the trigger file is present, the print job (i.e. the corresponding job template) is supplied to the further processing.

The checking of the presence of a trigger file can be executed with the scanning method described using FIG. 3, whereby in a step S7 it is established whether a trigger file has been generated. No further monitoring routines are thus necessary to monitor whether files have been completely finished. Given such an embodiment of the module 10, the module 11 can be omitted in the monitoring of the directories, meaning that the print jobs are forwarded directly to either the module 12 or 13.

The generation of a trigger file ensures that no incomplete print jobs are supplied to the further handling process and that all processes relevant for the writing of the print job have been ended without error.

The trigger file is either generated by an application program with which a new file is written into the directory to be monitored or the operating systems commands for writing of a file into a directory (such as, for example, write or move) are designed such that they automatically generate a trigger file. However, the generation of the trigger file is not executed by the control program 9, which can only monitor the generated trigger file.

The trigger file is erased when the print job finished by the control program 9 is forwarded as a print task to the conversion module 8.

The module 12 ("Job Sequencing") with which print jobs are arranged in a predetermined order is subsequently explained.

The control program 9 can be configured such that it either
1. does not sort print jobs,
2. sorts print jobs that are stored in a specific file directory in a specific order (module 12) or
3. sorts print jobs stored distributed over a plurality of file directories in a specific order (module 12).

Methods according to 1. and 2. are already known from the prior art. In these conventional methods for sorting of a print job within a file directory, the print jobs are sorted using the file access time that is stored upon generation of the respective file. However, it is hereby disadvantageous that the smallest time unit that is recorded in the file access time is typically 1 second. A plurality of files can be generated in a directory within one second, in particular given multitasking systems. A reasonable order of these print tasks can thus no longer be determined.

These problems are overcome with the module of the preferred embodiment for sorting of print jobs.

Files that belong to different print jobs can often be stored distributed across a plurality of file directories. A plurality of print jobs that can also be distributed across a plurality of directories can be sorted with the preferred embodiment. The directories for which a job template respectively applies are designated in the following as main directories. A plurality of sub-directories in which files of a job can also be stored can also be provided in a main directory. There are only prepared job templates for the main directories. The sub-directories are monitored together with the main directory.

Figure 4:
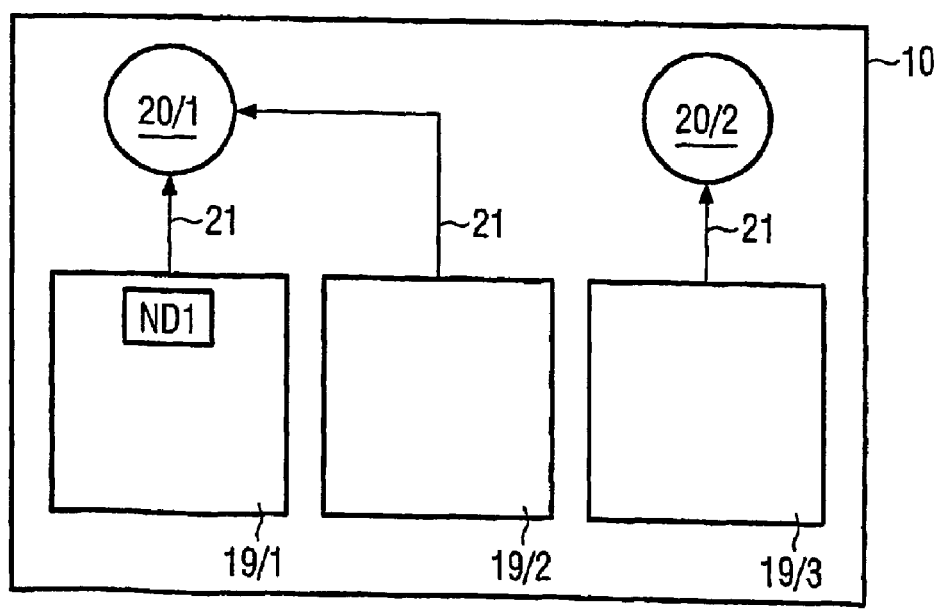
FIG. 4 shows schematically, a module of the control program in a block diagram.

A class that comprises methods and parameters is provided for sorting of print jobs stored across a plurality of directories, which class is designated as a job sequencing class. The configuration file of the control program 9 is designed such that, given the generation of the job template 19 (FIG. 4) for a directory whose print jobs should be sorted, an instance 20 of the job sequencing class is generated and the sample job template is provided with a pointer 21 that points to this instance 20. An instance is a runtime version of a class, i.e. a program to be executed in the working memory of a computer. The pointer 21 of the directories or of the corresponding sample job template 19/1, 19/2 in which the print jobs stored therein should be sorted in common all point to the same instance 20/1. The directories that are associated with a common instance of the job sequencing class can be used for acceptance of a single print job or also of a plurality of print jobs.

The instance 20 comprises parameters and routines for generation of successive (i.e. consecutive) job identification numbers. The routine for generation of the job identification number is called by the method described using FIG. 3*a* and FIG. 3*b* and in fact is called every time when a first file of a new print job is determined, for example in step S7. The corresponding job identification numbers are associated with the print jobs, whereby the sample job template is copied: and stored as a job template in which the job identification number is entered.

The individual print jobs are identified and sorted by module 12 using the job identification numbers. Since a job identification number is associated with each print job when this print job is generated in the respective directory, a correct number of the print jobs is obtained in the order in which the respective jobs 19 are called for writing of the files into the directories. The danger of errors due to an incorrect time recording is hereby significantly less than given conventional methods.

Given print jobs with a plurality of files, the point in time after which the individual print jobs are sorted is the point in time at which the first file of a print job is written (generated) in a directory.

Given use of the module 12: according to the sorting method described above, it is appropriate when the directories are scanned with the FastScan method of the module 10 and the scanning rate is selected high or the scanning intervals are selected short so that the temporal resolution of the detection of the generation of the print jobs is high.

Given the method of the preferred embodiment, print jobs can thus be sorted whose files are stored distributed across a plurality of file directories. The file directories that comprise files of print jobs that can be sorted in common respectively form a group of directories. Such groups of directories can comprise one or more directories. This method is thus also applicable in order to correctly sort print jobs in a single directory. Naturally, multiple groups of directories can also be provided with the method of the preferred embodiment, whereby the print jobs stored therein can be sorted independent of one another.

Given such complex methods for controlling document processing jobs, the control program 9 reads control parameters from different sources and stores them in a control file (the job ticket) associated with the document processing job or print job. Conventional control programs are designed such that the last read source for parameters overwrites the corresponding parameters in the control file. The order in which the individual sources are read out cannot be influenced. If a specific parameter should be defined in a plurality of sources, it is then left to chance which of the values of the different sources it adopts.

The system of the preferred embodiment is provided with a routine "set parameter (X, Y, Z)" with which a priority of a process step X is set dependent on a source Y and a priority Z. Sources for such parameters can be a job-specific job ticket, a sample job ticket (default job ticket), parameters in the print data and parameterized file names. WO 03/065197 A2, which was discussed above, is referenced in this regard. Control information from different sources is thus often mixed (merged) for a specific print job in the printing system. Additional control information can in particular be added by the printing system to already present, job-specific control information. Similarly, control information from parameterized file names that are contained in the print file are also mixed with one another. Via the establishment of the priorities for specific process steps dependent on the source it is ensured that, given writing of a parameter value from a source with a specific priority Z1, the parameter value is not overwritten in the event that it has already been written from another source Y2, whereby the priority Z2 of the source Y2 is higher than the priority Z1 of the source Y1. Upon setting of the parameter values, the priority of the respective source is also stored and associated with the parameter value. A comparison of the priority with a priority of a further source can hereby occur later.

This consideration of the priorities upon setting of the parameter values is taken into account in the module 13 upon composition of the parameter values of the print jobs for controlling the printing process.

The priorities of the individual sources are stored in a priority list, whereby a specific priority is associated with each source. A standard priority list (default priority list) is hereby normally used that is permanently stored in the printing system.

However, a user can also establish one or more further priority lists with which he himself determines the priorities of the different sources.

Given use of a plurality of priority lists, individual priority lists can be provided for specific parameters such as, for example, formdef, pagedef, print name, queue etc. or for groups of parameters such as, for example, for a specific section in the control file. However, it is also possible that different priority lists are selected dependent on the input, such as, for example, monitored input directory 7 (Hot Dir), Download, LP etc.

The control file so created is a printing system-specific job ticket that combines parameters from a plurality of sources, whereby the individual sources can also be task-specific job tickets, sample job tickets and other sources.

The automatically accepted, checked and possibly sorted print jobs that are completely composed and provided with control parameters are thus forwarded with the last module 13 as a print task to the conversion module 8.

The method explained above can be realized as a computer program product and comprise the modules 10 through 13 described above. The computer program product can be stored on a data medium.

In operation the computer program product is stored in the printing system 1 on the print server 4 and is executed there.

The method explained above is executed on a print server 4 that is normally a component of a high-capacity printing system such as, for example, the print server "PRISMAproduction" from Océ Printing Systems GmbH. Conventional PCs that often operate with a Windows operating system from Microsoft® are used as data sources 2 (FIG. 1) which supply the print server 4 with the print jobs to be printed.

The transfer of the print jobs from such a PC to a print server 4 was previously very complicated since a print server of a high-capacity printing system also requires certain control information (such as, for example, a print task-specific control file) that is normally not generated by a normal operating system of a PC.

The transfer of the print jobs was previously accomplished such that the PC on which the print jobs are generated has write rights to the directory or directories on the print server 4 over a network, which directory or directories are monitored by the module 10 for newly arriving print jobs. Additionally, the user had to either manually supplement the control data, an additional program being provided on the PC, which program generates the control data and adds the print job, or the print job was supplemented by a standard control file (default job ticket) on the print server, which is the case for the most part. The use of a program that composes the control data on the PC requires certain knowledge of the user about the high-capacity printing system to which the print data should be forwarded. However, this software cannot be integrated into the typical workflows on a PC without further measures since the files are to be manually copied into the directory, and in the event that a control file is used, this must be manually added to the print data.

When a plurality of print jobs belonging to a document processing job should be transferred, a corresponding sub-directory must be manually generated for this.

When the incoming print jobs on the print server are sorted in the order with which they are written into the directories, a plurality of print jobs may not be simultaneously copied manually into the directories, since then no control of the order with which they are written into the directories exists. When an error passes and crashes one of the processes on the PC or the network during the manual transfer of the print jobs, it can be that incomplete dilwa arrive at the printing system and correspondingly incomplete print products are generated.

A considerable need therefore exists to achieve a method and a system with which print jobs can be transferred from a PC operating with a Windows operating system from Microsoft® to a print server of a high-capacity printing system.

Figure 5:
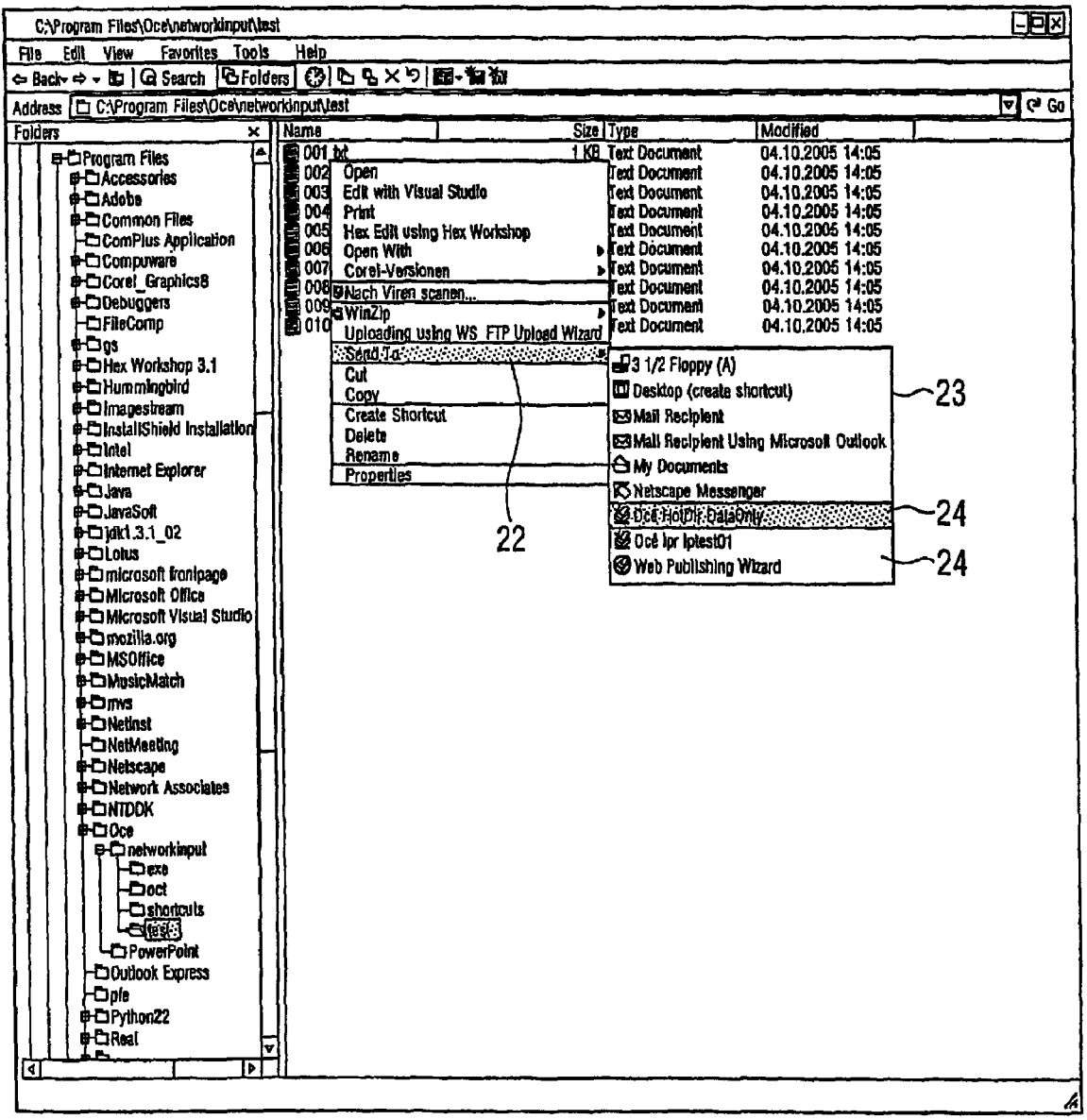
FIG. 5 is a screenshot of a program for presentation of files in which the function "Send to" has been called.

According to the preferred embodiment, the function "Send to" provided in Explorer by the different Windows operating systems from Microsofte that is shown in Explorer in a menu window upon clicking on a file with the right mouse button is used for this (FIG. 5). A service program Hot-DirWinClient.exe that automatically executes the transfer of the print jobs to the print server 4 is called with this function. This is a hidden service program that does not appear to the user of the PC. This user merely selects one or more files in Microsoft Explorer®, calls the function "Send to" 22 with the right mouse button and selects a print server 24 in a sub-menu 23. In the present exemplary embodiment, two print servers are listed in the sub-menu 23 that are designated as "océ HotDir DataOnly" and "océ Ipr Iptest01".

Figure 6:
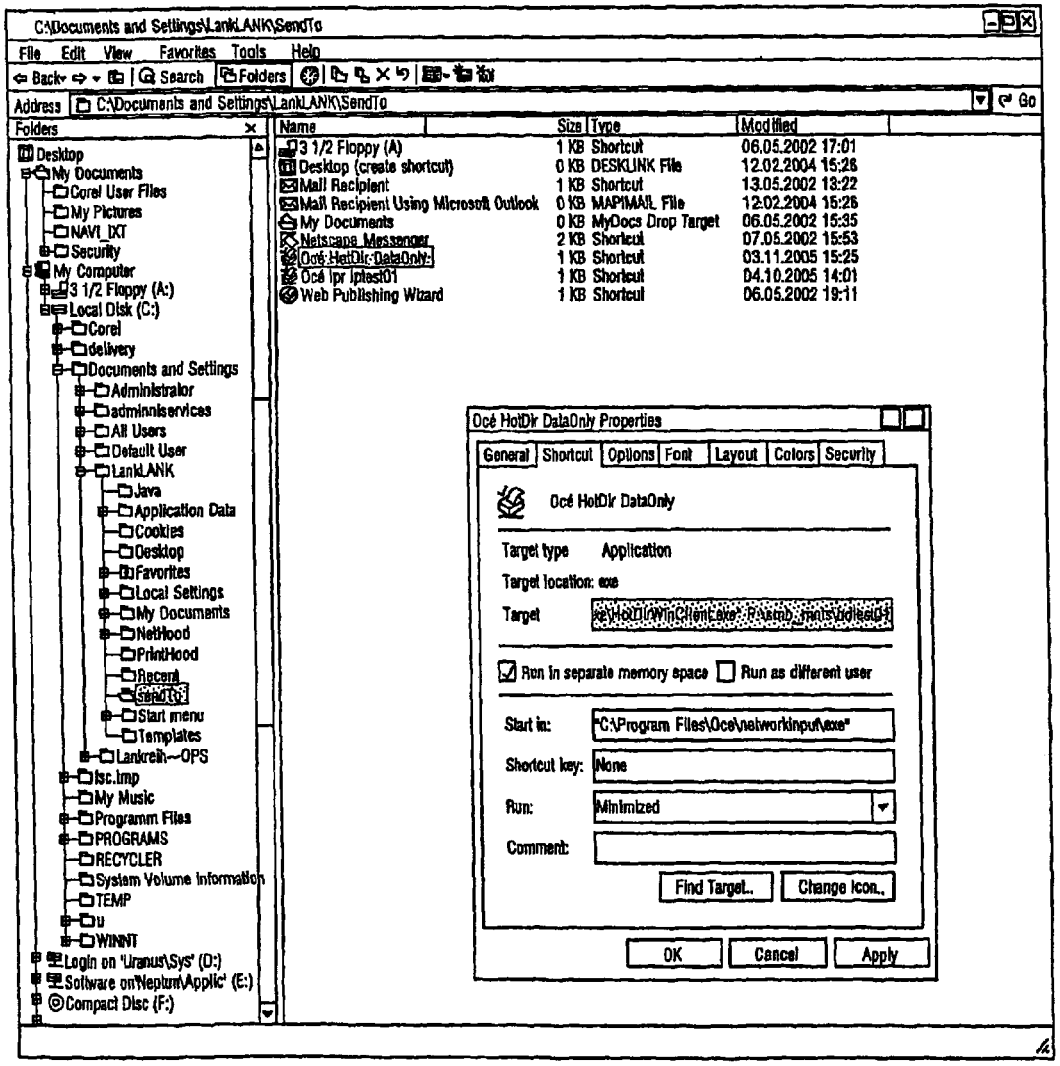
FIG. 6 is a screenshot in which a configuration menu of the function "Send to" is shown.

So that the user can utilize the function "Send to" 22, the program HotDirWinClient.exe is only to be configured once by a computer administrator for the function "Send to" 22. For this configuration menus must be provided in the respective operating system, as it is shown in FIG. 6, for example.

The following method steps, which are optional in part and can be configured differently, are executed upon calling of the program HotDirWinClient.exe:

A control file is automatically generated in which the control parameters for printing of the respective print job are listed (optional).

Figures 7, 8:
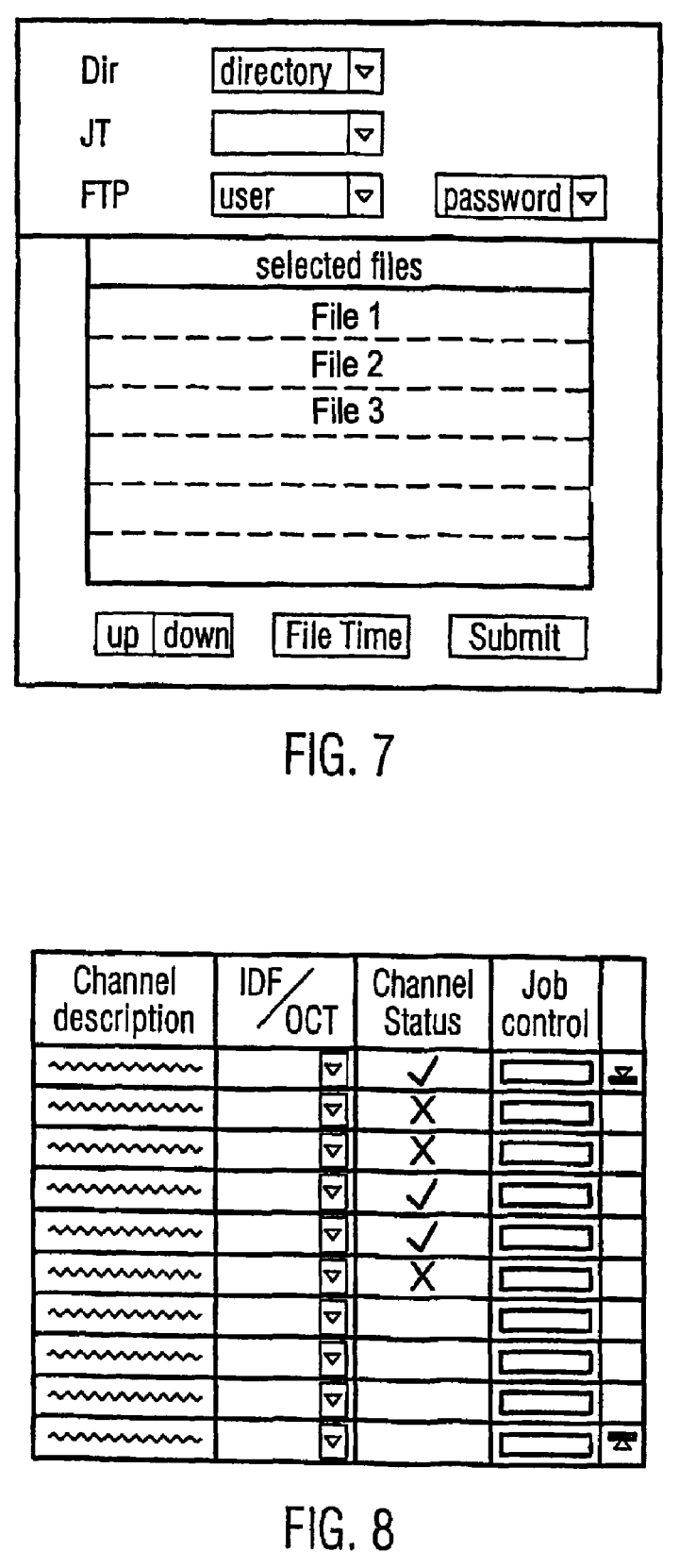

When a plurality of print jobs are selected and these print jobs should be combined into a document processing job ("grouped"), a corresponding sub-directory in which the print jobs are stored is automatically generated at the print server. This is displayed in this regard in a further window (FIG. 7) that is explained in detail below.

A trigger file with regard to the individual print jobs is advantageously generated as it is explained above so that it is ensured that no incomplete document processing job is executed.

The print data are advantageously transferred by means of the ftp protocol. Fewer common directories (shared/maped directories) must hereby be placed on the network, which simplifies the network structure and reduces the load of the print server.

If a plurality of files are selected by the user for transfer to a print server, an additional window (FIG. 7) can be opened in which the individual files or print jobs are listed. The files are displayed in the order to be printed. If the user wants to alter the order, he can select one of the files via a mouse click and shift said file upwards or, respectively, downwards in the list of the files via actuation of the icons "up" and "down".

This window is configurable, meaning that it is only displayed when the user has the possibility to actively affect the transfer of a plurality files (such as, for example, to alter the order).

If the print server to which the print jobs are to be transferred comprises a module for monitoring of the arrival of new files, which module operates with a conventional polling method and therefore can detect the arrival of the files with only a rough temporal resolution of, for example, one second, the possibility exists to call a function by means of the icon "FileTime", which function ensures that the individual files are transmitted to a print server with a minimum temporal interval $\Delta t$ of, for example, one to five seconds. It is hereby ensured that the order of the files is correctly detected at the print server.

Furthermore, further transfer parameters can be set in this menu, such as, for example, directory "Dir" in which the files should be stored in the print server, whether a specific control file (JobTicket: JT: for example JDF or OCT) should be added, via which ftp channel the files should be transferred and possibly a password.

The function "Send to" can be used not only for transfer of print jobs to a print server of a high-capacity printing system but rather also for output of a print file on a local printer. The print file is hereby transferred to the printer via the interface at which the local printer is connected, whereby the corresponding printer driver is called.

If print jobs should be sent from a client to different print servers, it can also advantageously be that a control window (FIG. 8) is also opened that lists a plurality of print channels via which the files can be transmitted. Such a control window exhibits, for example, four columns, whereby a description of the print channels is contained in the first column. In the second column it is specified whether control files are attached in the respective print jobs and in which format they are contained. Such control files can be contained according to a general standard (the JDF format). The applicant also uses a proprietary format that she has designated as the OCT format. The channel status that is indicated by a check (for example an "X") is indicated in the third column. A check means that the corresponding print channel is read to accept print jobs. In contrast to this, an "X" indicates that the print channel is blocked. In column 4 an icon is indicated that can be clicked with the mouse, whereby a window "Job control" is opened in which further information regarding the print jobs of this print channel are displayed, and these print jobs can be tracked and controlled.

With a drag-and-drop function, files can be placed from Microsoft Explorer® or another program for presentation of files from directories onto the description of individual channels, whereby the files are automatically transferred via these print channels.

On the one hand, the state of the print channels of the printing system can be surveyed all at once and a plurality of jobs can be transmitted to the print server with this small window. This small window thus allows a large control in a professional printing environment in which a plurality of print jobs are to be forwarded in a short time.

In all exemplary embodiments explained above, the control files or job tickets can be designed according to the JDF format and in particular can contain further JDF-specific control information in addition to the control information or control parameters specified above.

The preferred embodiment can be summarized briefly according to the following.

The preferred embodiment concerns a method for sorting of print jobs in a printing system.

The preferred embodiment concerns a method for generation of document processing jobs in a printing system, a method for sorting of print jobs in a printing system and a method for transmission of print jobs from a client to a printing system with a print server.

Given a method for generation of document processing jobs, control parameters are adopted from different sources into a control file (job ticket) according to predetermined priorities. Given a method for sorting of print jobs in a printing system, in directories to be monitored, in which directories files of a new print job are automatically discovered, the identification numbers that are respectively, chronologically generated for a group of directories are associated with the print job. With, the method for transmission of print jobs it is possible to transfer print jobs from a client to a high-capacity printing system with the function "Send to".

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for generation of document processing jobs in a printing system, comprising the steps of:
    reading control parameters for the document processing jobs from different sources and storing them in a control file, priorities being associated with the sources, the priorities of the sources being defined in one or more priority lists, the priority of the respective source being determined using the priority lists upon writing of the parameters into the control file; and
    in the event specific control parameters are present in a plurality of the sources, storing in the control file the control parameters from the sources that have a highest priority.

2. A method according to claim 1 wherein given storage of a parameter in the control file, the associated priority of the source from which the parameter originates is stored in the control file in connection with the parameter.

3. A method according to claim 1 wherein one of the priority lists for determination of the priorities is selected dependent on a parameter type to be written.

4. A method according to claim 1 wherein one of the priority lists for determination of the priorities is selected dependent on an input via which the respective source of the parameter is obtained.

5. A method according to claim 1 wherein the control file comprises JDF-specific control information.

6. A method according to claim 5 wherein the control file corresponds to JDF format.

7. A method of claim 1 comprising the further steps of: for transmission of print jobs from a client to a printing system with a print server, comprising the steps of:
    transmitting document processing jobs to the printing system from a client with a print server;
    providing the client as a personal computer on which an operating system is installed, said operating system comprising a program for presentation of files in which program a function is provided for direct transmission to predetermined receivers;
    using the function for direct transfer of files for transmission of print jobs to a printer or a print server of the printing system; and
    automatically generating at the client upon transmission of a print job a control file in which control parameters for printing of the respective print jobs are listed.

8. A method according to claim 7 wherein a trigger file is generated with regard to the individual print jobs and is sent with the print jobs to the print server.

9. A method according to claim 7 wherein the print jobs are transferred to the print server by means of a ftp protocol.

10. A method according to claim 7 wherein a plurality of print jobs are selected and are transferred to the print server.

11. A method according to claim 10 wherein a further window is opened in which the individual print jobs are listed in an order to be printed, the order being alterable by the user.

12. A method according to claim 10 wherein the individual print jobs are transmitted to the print server with a minimum temporal interval $\Delta t$ of 1 to 5 seconds.

13. A tangible, non-transitory computer-readable medium comprising a computer program for generation of document processing jobs in a printing system and that performs the steps of:
    reading control parameters for the document processing jobs from different sources and storing them at a control file, priorities being associated with the sources;
    in the event specific control parameters are present in a plurality of sources, storing in the control file control parameters for sources that have a highest priority; and
    the computer program being sub-divided into a plurality of modules, a check as to whether a new file has been generated in a directory being executed in one of the modules, job templates being associated with the print job, and an order of processing of the individual print jobs in the individual modules being controlled by means of job lists in which the job templates belonging to the print jobs are entered insofar as the corresponding print job should be processed in the corresponding module.

14. A computer readable medium according to claim 13 wherein upon establishment of a new file of a new print job in a directory, a job template associated with the directory in which the file has been generated is generated via copying of a sample job template which comprises a pointer pointing to a specific instance for generation of job identification numbers.

15. A computer readable medium according to claim 14 wherein predetermined methods that are executed in the processing of the individual job templates in one of the modules are associated with the job templates.

16. A computer readable medium according to claim 13 wherein the computer program comprises a module for checking whether arrived files or print jobs are finished.

17. A computer readable medium according to claim 13 wherein the computer program comprises a module that sorts a plurality of pint jobs into a correct order to be printed.

18. A computer readable medium according to claim 13 wherein the computer program comprises a module that forwards print jobs to a printer for printing.

19. A computer readable medium according to claim 18 wherein the module is designed such that control parameters for the print jobs are read from different sources, whereby priorities are associated with the sources, and in the event that specific control parameters are present in a plurality of sources, the control parameters from those sources that possess a highest priority are used.

\* \* \* \* \*